(12) United States Patent
Meyering et al.

(10) Patent No.: US 12,465,666 B1
(45) Date of Patent: Nov. 11, 2025

(54) HEMOSTATIC FOAMS

(71) Applicant: Moonshot Medical LLC, St Paul, MN (US)

(72) Inventors: Emily Meyering, Minneapolis, MN (US); Benjamin Arcand, Minneapolis, MN (US)

(73) Assignee: Moonshot Medical LLC, St. Paul, MN (US)

( * ) Notice: Subject to any disclaimer, the term of this patent is extended or adjusted under 35 U.S.C. 154(b) by 405 days.

(21) Appl. No.: 18/131,288

(22) Filed: Apr. 5, 2023

Related U.S. Application Data

(60) Provisional application No. 63/327,555, filed on Apr. 5, 2022.

(51) Int. Cl.
*A61L 24/02* (2006.01)
*A61L 24/08* (2006.01)

(52) U.S. Cl.
CPC ............... *A61L 24/02* (2013.01); *A61L 24/08* (2013.01); *A61L 2300/802* (2013.01); *A61L 2400/04* (2013.01)

(58) Field of Classification Search
CPC ...... A61L 24/02; A61L 24/08; A61L 2400/04; A61L 2300/802
See application file for complete search history.

(56) References Cited

U.S. PATENT DOCUMENTS

2014/0316012 A1* 10/2014 Freyman ............... A61L 24/046
514/772.3

* cited by examiner

*Primary Examiner* — Shirley V Gembeh
(74) *Attorney, Agent, or Firm* — Matthew J. Smyth

(57) ABSTRACT

A hemostatic formulation may include a gas component; a liquid vehicle; a surfactant; at least one of a mucosoadhesive or a thickening agent; and a coagulant. The at least one of the mucosoadhesive or the thickening agent may be Carbopol. The coagulant may include at least one of chitosan, kaolin, chitin. The surfactant may include at least one of polysorbate and glycerol. The hemostatic formulation may further include a viscosity-enhancing agent, which, in some implementations, may be a poly-N-isopropylacrylamide (pNIPAM).

6 Claims, 4 Drawing Sheets

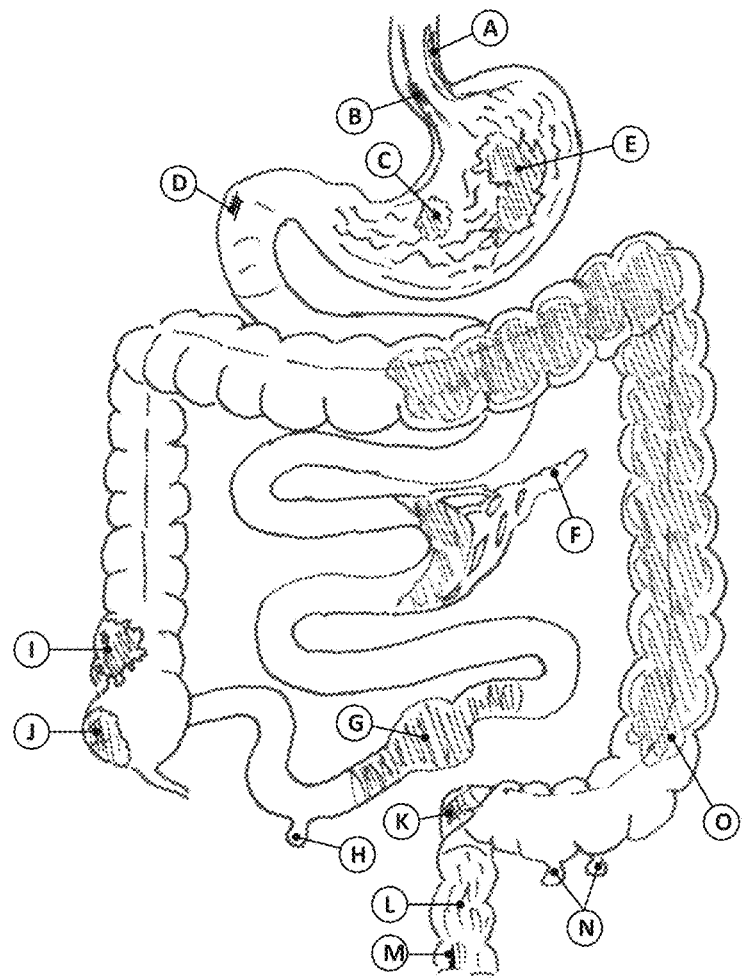

Upper Gastrointestinal Bleeding
Ⓐ Esophageal varices
Ⓑ Mallory-Weiss tear
Ⓒ Gastric ulcer
Ⓓ Duodenal ulcer
Ⓔ Hermorrhagic gastritis

Small Intestine Bleeding
Ⓕ Ischemic bowel disease
Ⓖ Intussusception
Ⓗ Mickel's diverticulum

Large Intestinal Bleeding
Ⓘ Angiodysplasia
Ⓙ Colonic carcinoma
Ⓚ Rectosigmoid carcinoma
Ⓛ Hemorrhoids
Ⓜ Anal fissure
Ⓝ Diverticulosis
Ⓞ Inflammatory bowel disease

FIG. 1

HEMOSTATIC FOAMS

CROSS-REFERENCE TO RELATED APPLICATIONS

This application claims the benefit of U.S. Provisional Application Ser. No. 63/327,555 titled "Hemostatic Foams," filed on Apr. 5, 2022. This application incorporates herein the foregoing application.

TECHNICAL FIELD

Various implementations relate generally to hemostatic foams.

BACKGROUND

Gastrointestinal bleeding (GIB) is a condition (acute or chronic) where bleeding occurs in the gastrointestinal system (see FIG. 1). GIB results in over 500,000 hospital admissions, over 2 million hospital days, $5 billion in direct costs, and nearly 11,000 in-hospital deaths.

The upper GI tract consists of the mouth, pharynx, esophagus, stomach, and the first part of the small intestine (duodenum), whereas the lower GI tract includes the other parts of the small intestine (jejunum and ileum) and the large intestine (cecum, colon, and rectum). Serious GIB may affect a patient's blood pressure and heart rate and may lead to significant morbidities and even death.

Endoscopic intervention is often the first line of therapy for upper- and lower-GI bleeding. Devices used for endoscopic hemostasis in the GI tract can be classified into injection devices (e.g., needles), thermal devices (e.g., multipolar/bipolar probes, hemostatic forceps, heater probe, argon plasma coagulation, radiofrequency ablation and cryotherapy), mechanical devices (e.g., clips, suturing devices, banding devices, stents), and topical devices (e.g., hemostatic sprays).

Hemoclips are currently the most widely used method in the United States. Several limitations are associated with hemoclips in the context of traditional endoscopic methods. The location of the lesion may hinder the ability to treat it or may place it at risk for a complication. For example, hemoclips cannot be placed on lesions that are located high on the lesser curvature of the gastric wall or on portions of the duodenal bulb; and perforation may occur if cautery is repeatedly applied to a wall of thin bowel tissue. Rebleeding is another significant and expensive outcome of current technologies. Some patients have such severe bleeding that the site cannot be localized and a directed therapy cannot be applied to control the bleeding. Rebleeding may occur in 10% to 20% of patients who are treated with endoscopic modalities, and treatment is usually less effective when it is repeated. Lastly, certain patient groups are more difficult to treat with traditional methods. These include patients who have peptic ulcers that are larger than 2 cm in size or blood vessels that are larger than 2 mm in diameter, patients who have multiple comorbid illnesses, and patients who are taking antithrombotics.

Hemospray is a mineral powder that is administered endoscopically with a canister of $CO_2$ and promotes hemostasis; it is sold by Cook Medical and received FDA approval in 2018. Hemospray's inorganic powder forms an adhesive layer when it comes into contact with fluid. The adhesive layer provides mechanical compression and promotes hemostasis. In addition, the powder absorbs water, increasing the concentration of platelets and clotting factors at the site of bleeding, which promotes the formation of an adherent coagulum. The device consists of a pressurized $CO_2$ canister, a delivery catheter, and a powder reservoir. The powder and coagulated blood mixture may remain in place for up to approximately 3 days, at which time it sloughs from the mucosa and is eliminated from the GI tract naturally.

In some applications, Hemospray has a significant re-bleed rate. Some physicians have indicated that the product sloughs off in as little as one hour. Additionally, if water or blood enters a catheter placed endoscopically (through which the Hemospray is delivered), the liquid may clot the powder in the device and render it unusable. The entire unit must then be replaced, adding significant expense to the patient's treatment. Due to concerns for gas embolism, the manufacturer has also listed the presence of varices as a contraindication to the use of Hemospray (all products with compressed gas in this area also carry this contraindication).

New, simple-to-use, effective, and safe technologies are needed to address some of the challenges posed by the current endoscopic hemostatic techniques; and there remains an unmet clinical need for a hemostatic device that (i) is easily administered, (ii) is biocompatible, and (iii) causes rapid blood clotting.

SUMMARY

Described herein are in situ foams for a broad range of applications, including sclerotheroapy, drug delivery and wound healing/hemostasis. These foams differ from other hemostatic products on the market or in development because they are not composed of polyurethane, are not pre-formed sponges, nor require compressed gas for delivery. An injectable delivery mechanism is attractive because it enhances conformity to irregular wound cavities. The novel foams may be created using off-the-shelf or easy-to-manufacture syringe systems capable of creating uniform pore sizes with minimal mixing or reconstitution steps. The delivery tool allows for the mixing of two components (liquid and air) that, when mixed, provide a uniform foam composition. These fine porosity foams are stable for tunable periods of time ranging from minutes to several hours depending on the chemistry employed.

A foam that is both stable for up to 24 hours and capable of delivering coagulating moieties may be a valuable agent for providing robust hemostasis to actively bleeding GI sites. Hemostatic foams may be provided as a kit containing the pre-filled syringe and mixing/delivery tool.

BRIEF DESCRIPTION OF THE DRAWINGS

FIG. 1 depicts a human gastrointestinal tract and highlights several regions where bleeding may occur

DETAILED DESCRIPTION

Figure 2:
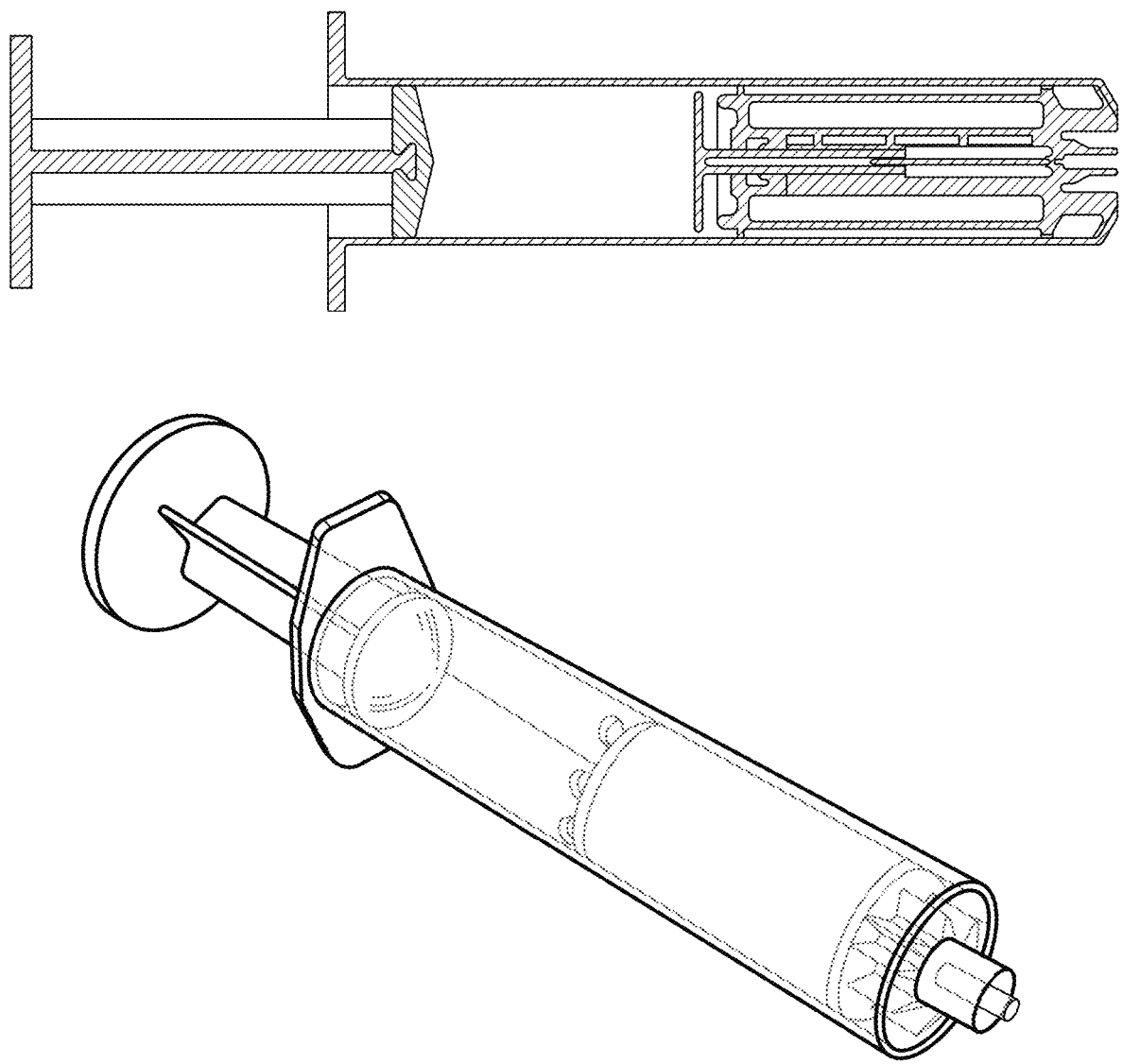
FIG. 2 illustrates exemplary syringe devices that may be employed to generate hemostatic foams.

A successful hemostatic agent may be characterized by a lack of cytotoxicity, biodegradability and a high rate of blood sorption. Described herein are hemostatic foam formulations containing a gas component (e.g., air), liquid vehicle (e.g., water/buffer), surfactant (e.g., polysorbate), a mucosoadhesive/thickening reagent (e.g., Carbopol) and a coagulant (e.g., chitosan). The above components may be combined and prepared in a pre-filled syringe. The syringe may be attached to a foam-generating luer tip unit and plunged to create a dense foam (See FIG. 2). The foam may be dispensed through any gauge needle or delivery catheter to deliver the foam to the site of bleeding.

There are many challenges when trying to deliver a hemostatic therapeutic to the GI track. The continuous secretion of mucus in the GI tract is a large hurdle. Mucus secretion acts as a lubricant to facilitate the passage of digestive matter and to protect the underlying epithelium from pathogens and mechanical stress. The mucus is composed of water and mucin protein molecules coated with proteoglycans, which gives the mucus a negative charge. The gastrointestinal mucus layer is constantly renewed with an average mucus production of 5-10 L/day. Its thickness varies all along the gastrointestinal tract, being thickest in the stomach and the colon compared with the small intestine.

Various hemostatic agents may be used in hemostatic foams, including chitin, chitosan, cellulose, mineral clays and other natural polysaccharides. Chitosan has been used in medical and surgical procedures through direct application to bleeding sites in physical forms, including powders, solutions, films and hydrogels. Chitosan is a natural, biodegradable, linear polysaccharide polymer composed of randomly distributed β-(1→4)-linked D-glucosamine (deacetylated unit) and N-acetyl-D-glucosamine (acetylated unit.) This polymer is available in several forms and has been applied directly to bleeds to effectively achieve hemostasis. Chitosan has been used extensively in medicine because of its impressive biological properties including cytocompatibility and anti-pyrogenic activity. Chitosan has also shown evidence of antibacterial properties against various bacteria strains. Chitosan is also susceptible to biological degradation in humans. Chitosan works as a hemostatic agent by interacting with negatively charged thrombocytes and erythrocytes, resulting in blood clot formation. Thus, in some applications, it constitutes a great candidate as an efficient hemostatic agent with various bioactive properties.

Kaolin is an inorganic clay that has similar electrostatic interaction to chitosan in relation to the blood clotting pathway. Kaolin works by activating factor XII, a protein factor that helps to initiate the coagulation cascade, a protein chain reaction, thus providing hemostasis.

Finally, viscosity enhancing agents may be added to provide unique foam characteristics. One such example is a poly-N-isopropylacrylamide (pNIPAM) polymer that is liquid at room temperature and solidifies at body temperature. This unique polymer is soluble in other foam reagents and above ~32° C. stiffens to help make a more robust foam construct. This component may improve the contact time in the GI system, in some applications.

An exemplary hemostatic foam composition includes saline, polysorbate, glycerol, air and thrombin. By varying the concentrations of the polysorbate and glycerol, more and less dense foams may be created that are stable up to 60 min. Thrombin may be employed as a coagulant; however, use of thrombin may be limited to applications in which it can be kept dry and at a temperature of −20° C. or colder. Other coagulating agents may be employed, including chitin, chitosan, kaolin and related clays, gelatin, collagen, cellulose and oxidized cellulose. In many applications, hemostatic foams with chitin, chitosan and kaolin may be particularly advantageous.

Foam formulations have been tested in vitro to assess foam density, relative pore size, and rate of foam volume reduction (e.g., the time it takes to lose 25%, 50% and 75% of the foamed volume over time). Several surfactants have been included to help reduce the surface tension to create smaller, more uniform bubbles; including polysorbate 80, polysorbate 20 and sodium lauryl sulfate. Additional surfactants, including betaine and several carbopols, may also be employed.

Figure 3:
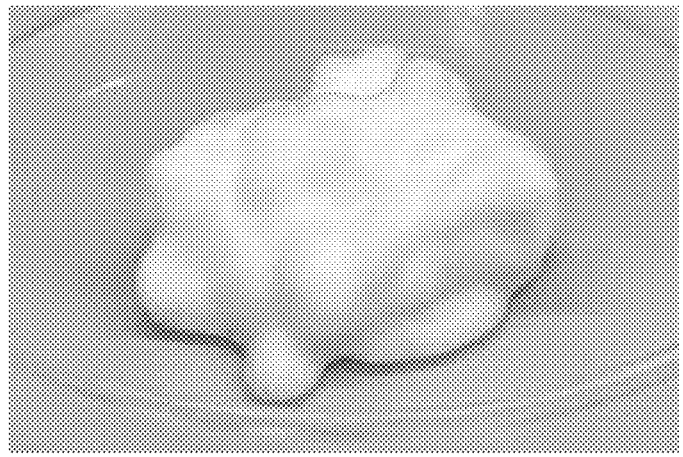
FIG. 3 illustrates an exemplary thrombin foam.
Figure 4:
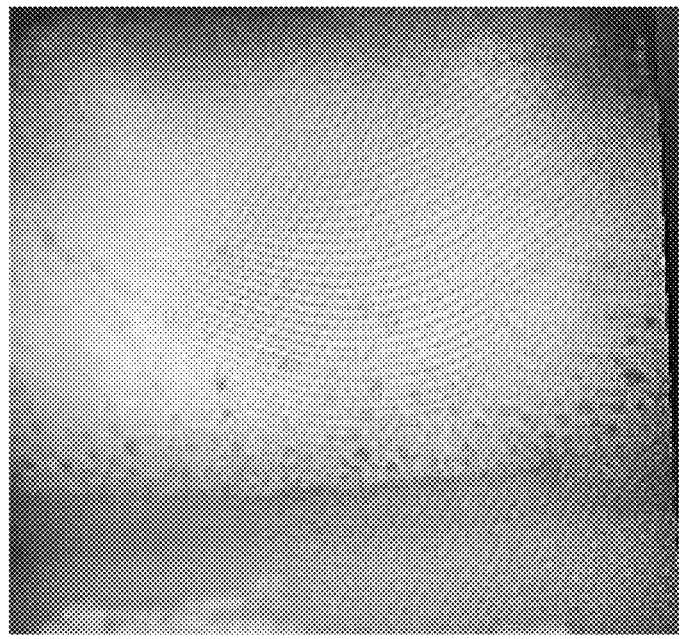
FIG. 4 illustrates the exemplary thrombin foam of FIG. 3, disposed in the esophagus of a porcine model
Figure 5:
FIG. 5 illustrates the exemplary thrombin foam of FIG. 3, disposed in a sample of heparinized porcine blood.

An exemplary thrombin foam (see FIG. 3) was created with a dual-syringe device having a Luer stopcock connector and tested in a cadaveric porcine model. The formulation included glycerol, thrombin, sodium lauryl sulfate, and saline. The device was packaged as a pre-filled syringe of the foaming liquid components on one side of the Luer (1 mL) and a syringe containing 6 mL of air in the other syringe. A plastic, flexible 18-gauge flexible introducer was placed on to the end of the Luer stopcock and the foam generation proceeded with 15 mixes back and forth with the stopcock closed to the introducer. Once the dense foam was created, the introducer was placed approximately 20 cm into the esophagus of the porcine model. The stopcock was opened, and the foam was injected (see FIG. 4). The prototype foam quickly expanded and filled the esophagus for the duration of imaging (several minutes). The foam was easy to apply and was injected easily next to an endoscope camera (Visura, Inc.) with a camera to visualize the space. The thrombin foam was also injected into a sample of heparinized porcine blood (FIG. 5) and quickly thickened the blood.

In some implementations, hemostatic foams have the following design requirements: (a) the foam remains in full contact of the GI system for at least 20 minutes; (b) the foam formulation adheres to mucosal tissue and; (c) the hemostatic foam maintains hemostasis for at least 2 hours (with an ultimate goal of exceeding 24 hours).

Additional components may be included with a hemostatic foam to (i) increase the time the foam remains in direct contact with circumferential GI tissues; (ii) extend the duration of clotting effect; (iii) resist sloughing of the mucous in the GI tract; and (iv) tailor pH to specific locations within the GI system.

In some implementations, combinations of multiple clotting agents may be employed (e.g., kaolin and chitosan). Other components of the foam may include a volume of air, buffer, glycerol, viscosity/stability enhancing reagent and surfactant. In some implementations, foams may be composed of water-soluble solutions or suspensions and air and avoid solvents and non-biocompatible reagents that may illicit an immunogenic response.

In some implementations, a device that produces hemostatic foams may be designed to produce a fine, consistent bubble size foaming agent as a carrier for hemostatic agents. The device may enable a user to prepare the foam with one hand in a manner that facilitates agitation of the solutions by a reciprocating spring-return plunger motion. A single syringe system or a dual syringe system may be employed, which, when the plunger is simply pressed several times, creates a robust and stable foam that may be applied to the patient with an applicator tip.

Novel hemostatic foams described herein may have a significant impact on patients with GI bleeding by improving their quality of life and reducing the risk of reoperation, injury or death. Moreover, the flexibility of compositions described herein and biodegradability of these foams may reduce the overall risks to patients by eliminating or reducing the need for additional surgical interventions and unnecessary inflammatory cascades during healing.

Additional benefits may inure to the military and the scientific community through a platform that may provide targeted delivery of drugs and biologics for targeted periods of time in acute settings where quick hemostasis is required. Additional small molecules may be incorporated into the foam platform (including anti-inflammatory agents and pain relievers) to expand the applications and effectiveness of the technology.

What is claimed is:

1. A hemostatic formulation comprising:
   a gas component;
   a liquid vehicle;
   a surfactant;
   at least one of a mucosoadhesive or a thickening agent; and
   a coagulant.

2. The hemostatic formulation of claim 1, wherein the at least one of the mucosoadhesive or the thickening agent comprises Carbopol.

3. The hemostatic formulation of claim 1, wherein the coagulant comprises at least one of chitosan, kaolin, chitin.

4. The hemostatic formulation of claim 1, wherein the surfactant comprises at least one of polysorbate and glycerol.

5. The hemostatic formulation of claim 1, further comprising a viscosity-enhancing agent.

6. The hemostatic formulation of claim 5, wherein the viscosity-enhancing agent is a poly-N-isopropylacrylamide (pNIPAM).

* * * * *